United States Patent
Strandborg et al.

(10) Patent No.: US 12,532,080 B2
(45) Date of Patent: Jan. 20, 2026

(54) EXPOSURE CONTROL USING LIQUID CRYSTAL DEVICE

(71) Applicant: Varjo Technologies Oy, Helsinki (FI)

(72) Inventors: Mikko Strandborg, Hangonkylä (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 156 days.

(21) Appl. No.: 18/515,916

(22) Filed: Nov. 21, 2023

(65) Prior Publication Data

US 2025/0168518 A1  May 22, 2025

(51) Int. Cl.
*H04N 23/73* (2023.01)
*H04N 23/71* (2023.01)
*H04N 23/741* (2023.01)
*H04N 23/75* (2023.01)

(52) U.S. Cl.
CPC .......... *H04N 23/741* (2023.01); *H04N 23/73* (2023.01)

(58) Field of Classification Search
CPC ...... H04N 23/741; H04N 23/73; H04N 23/71; H04N 23/75
See application file for complete search history.

(56) References Cited

U.S. PATENT DOCUMENTS

2016/0127629 A1* 5/2016 Sun .................. H04N 23/75 348/362
2019/0306388 A1* 10/2019 Matsumoto ............ G02F 1/157

* cited by examiner

*Primary Examiner* — Ahmed A Berhan
(74) *Attorney, Agent, or Firm* — Ziegler IP Law Group, LLC.

(57) ABSTRACT

Disclosed is an imaging system including an image sensor with a plurality of photo-sensitive cells arranged on a photo-sensitive surface of the image sensor; a light valve device with an array of light valves, wherein the array of light valves is arranged on an optical path of the photo-sensitive surface of the image sensor; and at least one processor configured to: control an exposure of photo-sensitive cells of at least a first region in the photo-sensitive surface by utilising respective light valves of said array; read out image data from the photo-sensitive cells of the image sensor; and process the image data to generate an image.

13 Claims, 2 Drawing Sheets

EXPOSURE CONTROL USING LIQUID CRYSTAL DEVICE

TECHNICAL FIELD

The present disclosure relates to imaging systems exposure control using light valve devices. The present disclosure also relates to methods incorporating exposure control using light valve devices.

BACKGROUND

Nowadays, with an increase in number of images being captured every day, there is an increased demand for developments in image processing to generate images having high resolution, minimal or no noise and blur, and less visual artifacts. Existing equipment and techniques for capturing such images are susceptible to having noise, colour bleeding, bright spots, and similar in the images. Resultantly, such images are blurry and/or often generated with considerable latency/delay, thereby not accurately representing the real-world environment.

The existing equipment and techniques for processing the images are inefficient in terms of generating images which accurately represent the real-world environment throughout a wide field of view. This is because processing of image signals captured by an image sensor required considerable processing resources, involves a long processing time, and requires high computing power. Conventionally, image capturing systems employ a rolling shutter design. Herein, an exposure time of an image frame is controlled by synchronising a time instance of resetting (namely, draining) each photo-sensitive cell of the image sensor to a time instance when a voltage value of a capacitor corresponding to each photo-sensitive cell of the image sensor is read out. The reading out of each photo-sensitive cell of the image sensor drains capacitor(s) of the image sensor.

This simulates a mechanical rolling shutter. The image sensor is exposed to light when the photo-sensitive cell is reset and ends when the voltage value of the capacitor corresponding to the photo-sensitive cell is read back. This means that each pixel in the image receives constant exposure time to an imaging target, which leads to distortion and/or presence of visual artefacts in the image.

Therefore, in light of the foregoing discussion, there exists a need to overcome the aforementioned drawbacks.

SUMMARY

The aim of the present disclosure is to provide imaging systems and methods incorporating exposure control using light valve devices, to generate high-dynamic range (HDR) images, by controlling exposure of each photo-sensitive cell of the image sensor. The aim of the present disclosure is achieved by imaging systems and methods which incorporate exposure control using light valve devices as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
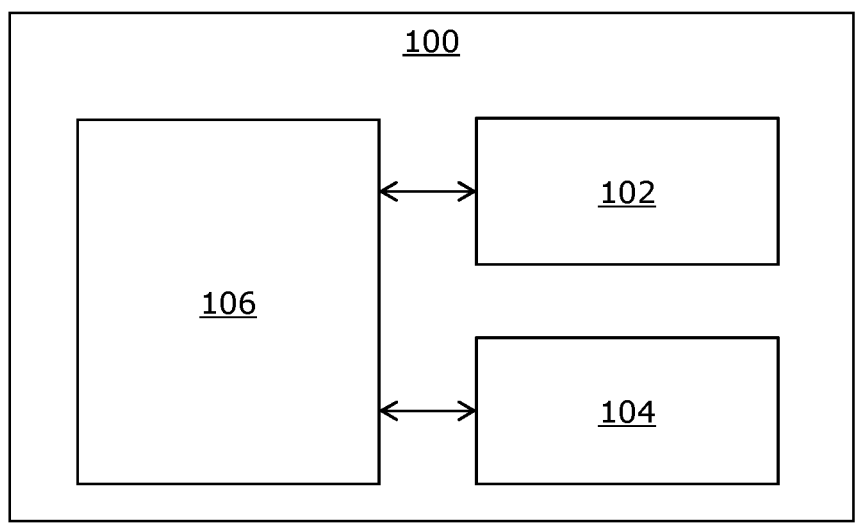
FIG. 1 illustrates a block diagram of an architecture of an imaging system incorporating exposure control using light valve device, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an imaging system comprising:
  an image sensor comprising a plurality of photo-sensitive cells arranged on a photo-sensitive surface of the image sensor;
  a light valve device comprising an array of light valves, wherein the array of light valves is arranged on an optical path of the photo-sensitive surface of the image sensor; and
  at least one processor configured to:
    control an exposure of photo-sensitive cells of at least a first region in the photo-sensitive surface by utilising respective light valves of said array;
    read out image data from the photo-sensitive cells of the image sensor; and
    process the image data to generate an image.

In a second aspect, the present disclosure provides a method implemented by an imaging system comprising an image sensor, a light valve device and at least one processor, the method incorporating exposure control using the light valve device, wherein the method comprises:
  controlling an exposure of photo-sensitive cells of at least a first region in the photo-sensitive surface by utilising respective light valves of said array;
  reading out image data from the photo-sensitive cells of the image sensor; and
  processing the image data to generate an image.

The present disclosure provides the aforementioned imaging system and the aforementioned method incorporating exposure control using the light valve device to generate images which accurately represents the real-world environment, in computationally-efficient and time-efficient manner. Herein, the exposure on the photo-sensitive cells arranged on the photo-sensitive surface is controlled dynamically, by selectively controlling an opening or closing of the light valves in said array. The light valves control how much light is to be incident on each of the plurality of photo-sensitive cells, and different areas in the photo-sensitive surface of the image sensor is exposed to the light at different times. Beneficially, this helps prevent representation of motion blur of any object in motion, in the real-world environment. The image data is read out sequentially, which is well-known in prior art. The arrangement of the image sensor and the light valve device facilitates high dynamic range (HDR) imaging to capture HDR images. Hence, a viewing experience of a user would become highly immersive and realistic, when the image is subsequently shown to the user. The imaging system and the method are simple, robust, fast, reliable and can be implemented with ease.

Throughout the present disclosure, the term "imaging system" refers to an apparatus used for imaging a real-world environment. The imaging system may be used for imaging real-world environments for a variety of applications including, but not limited to, extended-reality (XR), inspection of the real-world environment, machine vision, gaming, art, and similar. Optionally, the imaging system further comprises a lens system arranged on an optical path of the light valve device. The lens system is arranged in front of the light valve device. A technical effect of arranging the lens system in such a manner is that said lens system focuses the light to be incident on the photo-sensitive surface of the image sensor.

Throughout the present disclosure, the term "image sensor" refers to a device that detects light from a real-world environment at its photo-sensitive surface, thereby enabling a plurality of photo-sensitive cells arranged on the photo-sensitive surface to capture a plurality of image signals. The plurality of image signals are electrical signals (namely, a current signal and/or a voltage signal) pertaining to a real-world scene of the real-world environment. The plurality of image signals constitute image data of the plurality of pixels photo-sensitive cells. Examples of the image sensor may include, but are not limited to, a charge-coupled device (CCD) image sensor, and a complementary metal-oxide-semiconductor (CMOS) image sensor. It will be appreciated that the plurality of photo-sensitive elements could be arranged in a required manner (for example, such as a rectangular two-dimensional (2D) grid, a polygonal arrangement, a circular arrangement, an elliptical arrangement, a freeform arrangement, and the like) to form the photo-sensitive surface of the image sensor. In an example, the image sensor may comprise 25 megapixels arranged in the rectangular 2D grid (such as a 5000×5000 pixel grid) on the photo-sensitive surface.

Throughout the present disclosure, the term "light valve device" refers to a filter which controls a transmitted spectral response. Herein, the light valve device is used to control an amount of the light to be incident on the photo-sensitive surface of the image sensor. Such controlling of the amount of light is performed by the light valve device by any one of: deflecting the light to be incident on the photo-sensitive surface, blocking the light. An example of the light valve device is a liquid crystal light valve device. Herein, the liquid crystal light valve device comprises a liquid crystal layer. This liquid crystal layer is implemented as a switching polarising filter, wherein the electrical signals are applied to voltage control the amount of light incident on the photo-sensitive surface of the image sensor, in a switching manner. Optionally, the light valve device used is a liquid crystal panel.

The light valve device comprises the array of light valves corresponding to the plurality of photo-sensitive cells, wherein the array of light valves is arranged (in other words, overlayed) directly in front of the plurality of photo-sensitive cells. The array of light valves is arranged in such a manner that the light to be incident on the photo-sensitive surface of the image sensor, first passes through the array of light valves. A given light valve is controlled to adjust an exposure of the image sensor. In this regard, when the given light valve is fully open, an amount of light that is incident on the image sensor, results in a bright exposure (for example, such as when capturing images during day-time). Alternatively, when the given light valve is partially closed, the amount of light that is incident on the image sensor results in a dark exposure (for example, such as when capturing images during night-time). It will be appreciated that the array of light valves could be arranged in a manner similar to the arrangement of the plurality of photo-sensitive cells.

Notably, the at least one processor controls an overall operation of the imaging system. It will be appreciated that the at least one processor is communicably coupled to the image sensor and the light valve device. The at least one processor could be implemented as any one of: an image signal processor, a microprocessor, a microcontroller, or a controller. As an example, the image signal processor may be a programmable digital signal processor (DSP). As another example, the at least one processor could be implemented as an application-specific integrated circuit (ASIC) chip or a reduced instruction set computer (RISC) chip.

The exposure of the photo-sensitive cells of at least a first region is controlled by controlling at least one of: a time of opening, a time of closing of the respective light valves of the array. In other words, the light valves in the light valve device are used to control the exposure of at least the first region of the image sensor underlying the respective light valve of said array. Throughout the present disclosure, the term "region" refers to a particular area in the photo-sensitive surface where the exposure of the photo-sensitive cells is controlled in a particular manner that is different when compared to a remaining area of the photo-sensitive surface. Herein, the first region in the photo-sensitive surface is any one of a bright region and/or a dark region, based on the amount of light incident thereupon. Notably, when a resolution (i.e., a number of respective light valves) of the light valve device matches a resolution (i.e., a number of corresponding photo-sensitive cells) of the image sensor in at least the first region, the exposure can be controlled per-pixel (optionally, per-subpixel) of the light valve device.

Optionally, wherein the at least one processor is configured to:
  detect when pixels in at least one image segment of a previous image have luminosity values that are higher than a predefined threshold luminosity value; and
  when it is detected that pixels in at least one image segment of a previous image have luminosity values that are higher than the predefined threshold luminosity value, identify a region in the photo-sensitive surface that corresponds to the at least one image segment of the previous image as the first region,
  wherein, when controlling, the exposure of the photo-sensitive cells of the first region in the photo-sensitive surface is reduced by utilising the respective light valves.

In this regard, exposure of areas (namely, the areas of the image that pertain to dynamic objects) of the photo-sensitive cells, that are known to be in motion relative to the imaging system (for example, when a user's gaze follows a moving object in smooth pursuit) are controlled in a per-pixel manner, while remaining photo-sensitive cells are read out sequentially. Hence, the at least one processor is configured to control the array of light valves of such areas at a particular time, such that different areas are controlled at different times. Thereby, each area on the photo-sensitive surface of the image sensor receives different exposures, wherein each area will have different luminosity values. The term "luminosity values" refers to values of brightness or intensity of each pixel in the at least one image segment of the previous image which represents how bright or dark a pixel is. Herein, the region whose luminosity values are higher than the predefined threshold of luminosity value is identified, depicting that visual artifact (for example, high exposure of the photo-sensitive cells in the region) could be present at that region. Herein, such regions can be identified based on an analysis of the at least one previous image, as a visual scene being captured by the imaging system does not change drastically. Subsequently, a corresponding region in a current image is determined by utilizing reprojection. Notably, the predefined threshold luminosity value depends on the bit size (for example, 8-bit, 16-bit, and similar) used for storing the luminosity value. Optionally, the predefined threshold luminosity value lies in a range of 80 percent to 100 percent of maximum saturation value of the image sensor. The predefined threshold luminosity value lies in a range of 80, 82, 85, or 90 percent to 88, 95, 98, or 100 percent of the maximum saturation value of the image sensor.

Herein, the pixels in the at least one image segment of the previous image having luminosity values that are higher than the predefined threshold luminosity value indicate that there is a moving object when the previous image was being captured. Herein, the at least one image segment is a portion of the previous image which represents at least one object in a visual scene of the image sensor. Moreover, the pixels which represent the moving object are brighter when compared to pixels which represent remaining real-world scene of the real-world environment. Subsequently, when this region in the photo-sensitive surface aligns with the pixels of the at least one image segment of the previous image, said region is designated as the first region. This first region is bright when compared to remaining portion in the photo-sensitive surface. This difference in brightness levels can be compensated during ISP processing, as the exposure time for each area in the image is known when capturing the image. Consequently, the respective light valves are controlled in a per-pixel manner to reduce an amount of light to be incident on the image sensor, which reduces the exposure of the corresponding photo-sensitive cells of the first region. A technical effect of controlling the exposure of the photo-sensitive cells of the first region in the photo-sensitive surface in such a manner is that it facilitates to prevent motion blur in the image in a dynamic manner.

Optionally, the imaging system further comprises a colour filter array (CFA) placed between the image sensor and the light valve device, in a manner that the light to be incident upon the image sensor passes through the CFA and is then detected at the photo-sensitive surface of the image sensor. A technical effect of placing the CFA in such a manner is that it enables capturing of colour information in the image sensor.

Throughout the present disclosure, the term "image data" refers to information pertaining to a given photo-sensitive cell arranged on the photo-sensitive surface of the image sensor, wherein said information comprises one or more of: a colour value of the given photo-sensitive cell, a depth value of given photo-sensitive cell, a luminance value of the given photo-sensitive cell. In some implementations, the image data is RAW image data that has been read out from the image sensor. The term RAW image data refers to image data that is unprocessed (or may be minimally processed) when obtained from the image sensor. The RAW form of the image data is well-known in the art. In other implementations, the image data is partially-processed image data that is generated upon performing certain image signal processing (ISP) on the RAW image data, for example, in an ISP pipeline.

Notably, the image sensor reads out only corresponding photo-sensitive cells from at least the first region of the photo-sensitive surface of the image sensor, instead of reading out each and every photo-sensitive cell from remaining photo-sensitive surface. Thus, when reading out the image data, image signals captured by the corresponding photo-sensitive cells of at least the first region are processed. It will be appreciated that when the plurality of photo-sensitive cells are arranged in the rectangular 2D grid on the photo-sensitive surface of the image sensor, the image sensor is configured to read out the image data in a line-by-line manner.

This image data is then processed by employing demosaicking and further processing by the at least one processor, to generate the image with accurate colour representation. Herein, the demosaicking is employed to estimate information regarding any missing colour for each pixel by analysing neighbouring areas. Subsequently, the image signal processor further processes the raw image to enhance a quality of said raw image, to produce the image. Beneficially, when further processing is subsequently performed after demosaicking, undesirable visual artifacts (such as colour bleeding) in at least one image frame is prevented, which otherwise would have been noticeable to a user when using the imaging system.

Throughout the present disclosure, the term "image" refers to a visual representation of the real-world environment. The term "visual representation" encompasses colour information represented in a given image, and additionally optionally other attributes associated with the given image (for example, such as depth information, luminance information, transparency information (namely, alpha values), polarization information, and the like).

Optionally, an exposure of a given photo-sensitive cell is controlled by at least one of:
  controlling a starting time instant at which a corresponding light valve starts to allow light to pass therethrough towards the given photo-sensitive cell,
  controlling a stopping time instant at which the corresponding light valve stops to allow the light to pass therethrough towards the given photo-sensitive cell,
  controlling a transparency of the corresponding light valve to partially allow the light to pass therethrough towards the given photo-sensitive cell,
  In this regard, a duration between the starting time instant and the stopping time instant is an exposure time period (namely, exposure time). This exposure time period refers to an integration time period, namely, a time period during which the given photo-sensitive cell on the image sensor collects photons of the light incident thereupon. For the given photo-sensitive cell, the exposure time period starts when the corresponding light valve starts to allow the light to pass therethrough towards the given photo-sensitive cell, and ends when the corresponding light valve stops to allow the light to pass therethrough. During this exposure time period, the given photo-sensitive cell receives the light, and a charge on the given photo-sensitive cell accumulates in proportion to the amount of light said given photo-sensitive cell receives. Optionally, when only the starting time instant or only the stopping time instant is controlled by controlling the corresponding light valve, the stopping time instant or the starting time instant is controlled by traditional methods (namely, by draining a capacitor charge of a cell of the image sensor, either by discarding the capacitor or by performing the read out). It will be appreciated that the exposure time period may be in milliseconds, seconds, and similar.

It will be appreciated that the transparency within the light valve device may not be same throughout the light valve device. This means that a given portion of the light valve device may be fully transparent, while another portion of the light valve device may be translucent (i.e., partially transparent) or even opaque (i.e., not transparent). Optionally, the transparency of the corresponding light valve depends on an intensity of the light which would pass through said corresponding light valve to be incident on the image sensor. When the corresponding light valve is implemented as a semi-transparent light valve, the light is partially allowed to pass therethrough towards the given photo-sensitive cell.

A technical benefit of controlling the exposure of the given photo-sensitive cell in such a manner is that by controlling the corresponding light valve separately, each photo-sensitive cell of the plurality of photo-sensitive cells are read out at different time instants, as all of the plurality of photo-sensitive cells cannot be read out simultaneously. Beneficially, this saves processing resources and is time-efficient.

Optionally, the exposure of the given photo-sensitive cell is further controlled by at least one of:
  increasing the transparency of the corresponding light valve over a first predefined time period after the starting time instant,
  decreasing the transparency of the corresponding light valve over a second predefined time period before the stopping time instant.

In this regard, the corresponding light valve gradually fades out (i.e., increases the transparency of the corresponding light valve) and fades in (i.e., decreases the transparency of the corresponding light valve) during a beginning and ending of the exposure time period. This fading out and fading in of the corresponding light valve can be performed by controlling the transparency of the corresponding light valve. Herein, when the fading out and the fading in is employed, a corresponding exposure time period of the corresponding light valve would be longer than an original exposure time that would be required for an instance when the transparency of the corresponding light valve is not controlled. Hence, a majority of the photons is received when the corresponding light valve is fully open and gradually diminish towards the beginning and the ending of the exposure time period. Herein, the first predefined time period is same as or different from the second predefined time period. The first predefined time period lies in a range of 0 percent to 50 percent of the exposure time. The first predefined time period lies in a range of 0, 5, 10, 20, or 40 percent to 15, 25, 35, 45, or 50 percent of the exposure time. The second predefined time period lies in a range of 0 percent to 50 percent of the exposure time. The first predefined time period lies in a range of 0, 5, 10, 20, or 40 percent to 15, 25, 35, 45, or 50 percent of the exposure time. A technical effect of controlling the exposure in such a manner is that effects of motion blur when generating the image is mitigated, while reaping the benefits of longer exposure time periods.

Optionally, the at least one processor is configured to control an exposure of photo-sensitive cells of a second region in the photo-sensitive surface also, by utilising respective light valves of said array, wherein the exposure of the photo-sensitive cells of the second region is different from the exposure of the photo-sensitive cells of the first region, wherein the image data is processed by utilising a high-dynamic range (HDR) imaging technique.

In this regard, the second region in the photo-sensitive surface is another one of the dark region or the bright region. In an embodiment, the first region is the bright region and the second region is the dark region, and the first region is captured with a short exposure time period when compared to the capturing of the second region by the image sensor. In another embodiment, the first region is the bright region and the second region is the dark region, and the light incident upon the first region can be dimmed by partially blocking said light by controlling the transparency of the corresponding light valve. This means that the image sensor reads out each of the plurality of the photo-sensitive cells arranged on the photo-sensitive surface in the second region. Thus, when reading out the image data, image signals captured by each and every photo-sensitive cell of the photo-sensitive surface in the second region of the image sensor are processed. A technical effect of controlling the exposure in such a manner is that the image so generated is an HDR image, which provides an immersive viewing experience to the user when the HDR image is subsequently shown to the user.

Optionally, the HDR imaging technique comprises at least one of: an HDR tone-mapping technique, an HDR exposure bracketing technique, an HDR exposure fusion technique, a dual ISO technique, an edge-preserving filtering technique (for example, such as a guided image filtering technique). The aforesaid HDR imaging techniques and their utilisation for generating HDR images are well-known in the art. The HDR exposure fusion technique is described, for example, in "*Exposure Fusion*" by T. Mertens et al., published in 15th Pacific Conference on Computer Graphics and Applications (PG'07), pp. 382-390, 2007, which has been incorporated herein by reference. The guided image filtering technique is described, for example, in "*Image Fusion with Guided Filtering*" by Shutao Li et al., published in IEEE Transactions on Image Processing, Vol. 22, No. 7, pp. 2864-2875, July 2013, which has been incorporated herein by reference.

Optionally, the at least one processor is configured to:
  detect when at least one image segment of a previous image represents at least one object that is in motion;
  when it is detected that at least one image segment of a previous image represents at least one object that is in motion, identify a region in the photo-sensitive surface corresponding to the at least one image segment of the previous image; and
  control an exposure of photo-sensitive cells of the identified region in the photo-sensitive surface by utilising a global-shutter setting for respective light valves of said array, wherein when utilising the global-shutter setting for the respective light valves, the at least one processor is configured to:
    control the respective light valves to stop allowing light to pass therethrough;
    drain the photo-sensitive cells of the identified region;
    control the respective light valves to simultaneously or near-simultaneously start allowing the light to pass therethrough towards the photo-sensitive cells of the identified region; and
    control the respective light valves to simultaneously stop allowing the light to pass therethrough, prior to reading out the image data from the photo-sensitive cells of the identified region.

In this regard, the at least one object is present in the real-world environment, which is captured by the image sensor. The motion of the at least one object is represented relative to a head pose, wherein the at least one object has changed position between the previous image and the image to be generated. Herein, the at least one object could be a dynamic object that is moving in the visual scene. Upon detecting such movement, the region (namely, an area) in the photo-sensitive surface of the image sensor that aligns with the at least one object in motion in the at least one image segment is determined. This enables to identify particular areas on the photo-sensitive surface of the image sensor that corresponds to areas of interest where the motion of the at least one object has been detected in a previous image.

Subsequently, the exposure of the photo-sensitive cells of said region is controlled by utilising the global-shutter setting, wherein the photo-sensitive cells of said region are exposed to light simultaneously. In this regard, the respective light valves of the array are controlled by the at least one processor in such a manner that the starting time instant and the stopping time instant of the corresponding light valves are controlled simultaneously or near-simultaneously. Herein, the term "near-simultaneously" refers to controlling the starting time instant or the stopping time instant with an imperceptible time lag after draining the photo-sensitive cells, to an extent that controlling the respective light valves and draining the photo-sensitive cells are almost simultaneous or happen nearly at a same moment. Consequently, this allows the photo-sensitive cells of said region to be exposed to the light simultaneously or near-simultaneously. Hence, the motion of the at least one object within the image is frozen, thereby enabling the image sensor to capture the at least one object in motion without any distortions.

Herein, the at least one processor is configured to stop the exposure of the photo-sensitive cells by controlling the respective light valves to block the right from reaching the photo-sensitive cells of said region. Subsequently, the photo-sensitive cells of the identified region are drained to initialize the photo-sensitive cells for subsequent exposure. Herein, the term "draining" refers to resetting or clearing accumulated charges in said photo-sensitive cells. Thereafter, a new exposure is started by controlling the respective light valves to start allowing light to pass therethrough, towards the photo-sensitive cells in the identified region, in a simultaneous or a near-simultaneous manner. Herein, depending on implementation, the exposure of the photo-sensitive cells in the identified region may not be fully simultaneous, but an operation of controlling the respective light valves in a simultaneous or a near-simultaneous manner is significantly faster than performing read out of the image data in a sequential (namely, rolling) manner.

Then, once sufficient exposure time is reached, the exposure is concluded by simultaneously or near-simultaneously stopping the light to pass therethrough to ensure that no more light reaches the photo-sensitive cells. This ensures that the entire image is captured at a same time. Thereafter, the image data from the photo-sensitive cells of the identified region is read out in the sequential manner, which is well-known in the art. This limits an amount of time the photo-sensitive cells of the identified region are exposed to the light.

A technical effect of controlling the exposure in such a manner is that an exposure time period is reduced from the previous exposure time period, even though the at least one object is in motion.

Optionally, the exposure of the photo-sensitive cells of an entirety of the photo-sensitive surface is controlled by utilising a global-shutter setting for the light valves of the array, wherein when utilising the global-shutter setting for the light valves of the array, the at least one processor is configured to:

control the light valves to stop allowing light to pass therethrough; drain the photo-sensitive cells;

control the light valves to simultaneously or near-simultaneously start allowing the light to pass therethrough towards respective photo-sensitive cells; and control the light valves to simultaneously or near-simultaneously stop allowing the light to pass therethrough, prior to reading out the image data from the photo-sensitive cells.

In this regard, the light valve device is implemented as the global shutter. In such an instance, the image is captured at the same time, and read out sequentially. A technical effect of utilising the global shutter setting in such a manner is that it prevents a rolling shutter effect when capturing the at least one object in motion. Herein, the rolling shutter effect arises when the at least one object being captured by the image sensor moves while the image is being captured, as a top of the image is captured at a different time than a bottom of the image. The procedure of configuring the at least one processor to control the respective light valves is explained in detail above.

Optionally, an illumination parameter varies spatially across a field of view (FOV) of the image sensor, the illumination parameter being any one of:

(i) a ratio of a per-pixel area (A) to pixels per degree (PPD), (ii) a ratio of a multiplication product of the per-pixel area and a relative illumination (A×RI) to the PPD, wherein the at least one processor is configured to control the exposure of photo-sensitive cells of different regions in the photo-sensitive surface, based on different values of the illumination parameter in the different regions.

The term "illumination parameter" of the image sensor refers to a metric that is indicative of an amount of illumination (namely, a light intensity or brightness) received at a given part of the image sensor. Greater the value of the illumination parameter in a given region of the image sensor, greater is the illumination received at the given region of the image sensor and greater is the brightness of a corresponding image segment of an image that is captured by the given region of the image sensor, and vice versa. It will be appreciated that when the illumination parameter varies spatially across said FOV of the image sensor, it means that different regions of the image captured by the image sensor would have different levels of brightness or light intensity, based on positions of the different regions. In other words, some regions of the image may appear to be relatively bright, while other regions of the image may appear to be relatively dim. The illumination parameter may vary differently for different cameras based on their optics.

It will be appreciated that when the illumination parameter is defined according to (i), and when the per-pixel area is same (i.e., fixed) for the image sensor, the illumination parameter would be inversely related to the PPD (namely, an angular resolution of the image sensor). Greater the PPD of a given region in a given FOV of the image sensor, lesser is the value of the illumination parameter in the given region of the given FOV, and vice versa. This is due to the fact that for a high PPD, a same amount of light would be incident towards (namely, would be distributed amongst) a greater number of photo-sensitive cells of the image sensor, as compared to that for a lower PPD. In other words, the PPD is indirectly related to a light receiving capability of the photo-sensitive cells of the image sensor. Greater the PPD, greater is the probability of capturing a given region of a given image with noise and less brightness, and vice versa.

Moreover, when optics of the different regions in the photo-sensitive surface are different, the relative illumination can also be taken into account for determining the illumination parameter, as described in (ii). When the PPD and the per-pixel area are fixed for the different regions in the photo-sensitive surface, the illumination parameter would be directly related to the relative illumination. Greater the relative illumination of a given region in a given FOV of the image sensor, greater is the value of the illumination parameter in the given region of the given FOV, and vice versa. The term "relative illumination" refers to a level of illumination for a given region in a given FOV of the image sensor with respect to a maximum level of illumination present anywhere across the given FOV. Typically, the relative illumination varies spatially across the given FOV of the image sensor in a manner that the relative illumination is highest at a central region of the given FOV and decreases on going away from the central region towards a peripheral region of the given FOV, the central region being surrounded by the peripheral region. The relative illumination may be expressed in terms of percentage, for example, lying in a range of 0 to 100, wherein 0 indicates no light (i.e., darkness) and 100 indicates a maximum brightness. The relative illumination could occur due to optical characteristics of optics of the imaging system, for example, such as shading, vignetting, anti-reflection coatings of said optics, angles of incidence of light (namely, chief ray angles and marginal ray angles), materials and surface properties of said optics, total internal reflection (TIR), and the like. The multiplication product of the per-pixel area and the relative illumination could be referred to as a photon-to-signal conversion efficiency of the given camera. The per-pixel area, the PPD, and the relative illumination are well-known in the art.

Since the per-pixel area (which is usually fixed), the PPD, and the relative illumination for the image sensor are already accurately known to the at least one processor, the at least one processor can easily detect values of the illumination parameter in different regions of the given FOV, for example, by employing at least one mathematical technique. In an example, the at least one processor may employ a look-up table for detecting the values of the illumination parameter in the different regions of the given FOV. For example, the lens system of the imaging system may have a distortion profile such that a central region of the image sensor may have a PPD of 60, while edges on a peripheral region of the image sensor may have a PPD of 30. Hence, the central region may receive lesser amount of light, as compared to the peripheral region of the image sensor. Resultantly, the peripheral region may be overexposed. Hence, the light valve device may be utilised to control the exposure of respective photo-sensitive cells of the central region and the peripheral regions differently, or control the transparency of the corresponding light valves of said array.

A technical effect of controlling the exposure of the photo-sensitive cells in such a manner is that it enables the imaging system to adapt to varying lighting conditions across the visual scene, even when there is high contrast.

The present disclosure also relates to the second aspect as described above. Various embodiments and variants disclosed above, with respect to the aforementioned first aspect, apply mutatis mutandis to the second aspect. The method is implemented by an imaging system comprising an image sensor, a light valve device and at least one processor Optionally, an exposure of a given photo-sensitive cell is controlled by at least one of:
 controlling a starting time instant at which a corresponding light valve starts to allow light to pass therethrough towards the given photo-sensitive cell,
 controlling a stopping time instant at which the corresponding light valve stops to allow the light to pass therethrough towards the given photo-sensitive cell,
 controlling a transparency of the corresponding light valve to partially allow the light to pass therethrough towards the given photo-sensitive cell.

A technical benefit of controlling the exposure of the given photo-sensitive cell in such a manner is that the corresponding light valve is controlled separately as each photo-sensitive cell of the plurality of photo-sensitive cells are read out at different time instants (because all of the plurality of photo-sensitive cells cannot be read out simultaneously).

Optionally, the method comprises controlling an exposure of photo-sensitive cells of a second region in the photo-sensitive surface also, by utilising respective light valves of said array, wherein the exposure of the photo-sensitive cells of the second region is different from the exposure of the photo-sensitive cells of the first region, wherein the image data is processed by utilising a high-dynamic range (HDR) imaging technique.

A technical effect of controlling the exposure in such a manner is that the image so generated is an HDR image, which provides an immersive viewing experience to the user when the HDR image is subsequently shown to the user.

Optionally, the method comprises:
 detecting when pixels in at least one image segment of a previous image have luminosity values that are higher than a predefined threshold luminosity value; and
 when it is detected that pixels in at least one image segment of a previous image have luminosity values that are higher than the predefined threshold luminosity value, identifying a region in the photo-sensitive surface that corresponds to the at least one image segment of the previous image as the first region,
wherein, at the step of controlling, the exposure of the photo-sensitive cells of the first region in the photo-sensitive surface is reduced by utilising the respective light valves.

A technical effect of controlling the exposure of the photo-sensitive cells of the first region in the photo-sensitive surface in such a manner is that it facilitates to prevent motion blur in the image in a dynamic manner.

Optionally, the method comprises:
 detect when at least one image segment of a previous image represents at least one object that is in motion;
 when it is detected that at least one image segment of a previous image represents at least one object that is in motion, identify a region in the photo-sensitive surface corresponding to the at least one image segment of the previous image; and
 control an exposure of photo-sensitive cells of the identified region in the photo-sensitive surface by utilising a global-shutter setting for respective light valves of said array, wherein when utilising the global-shutter setting for the respective light valves, the at least one processor is configured to:
 control the respective light valves to stop allowing light to pass therethrough;
 drain the photo-sensitive cells of the identified region;
 control the respective light valves to simultaneously or near-simultaneously start allowing the light to pass therethrough towards the photo-sensitive cells of the identified region; and
 control the respective light valves to simultaneously or near-simultaneously stop allowing the light to pass therethrough, prior to reading out the image data from the photo-sensitive cells of the identified region.

A technical effect of controlling the exposure in such a manner is that an exposure time period is reduced from the previous exposure time period, even though the at least one object is in motion.

Optionally, the exposure of the photo-sensitive cells of an entirety of the photo-sensitive surface is controlled by utilising a global-shutter setting for the light valves of the array, wherein when utilising the global-shutter setting for the light valves of the array, the method comprises:
- controlling the light valves to stop allowing light to pass therethrough;
- draining the photo-sensitive cells;
- controlling the light valves to simultaneously or near-simultaneously start allowing the light to pass therethrough towards respective photo-sensitive cells; and
- controlling the light valves to simultaneously or near-simultaneously stop allowing the light to pass therethrough, prior to reading out the image data from the photo-sensitive cells.

A technical effect of utilising the global shutter setting in such a manner is that it prevents a rolling shutter effect when capturing the at least one object in motion.

Optionally, an illumination parameter varies spatially across a field of view (FOV) of the image sensor, the illumination parameter being any one of:
(i) a ratio of a per-pixel area (A) to pixels per degree (PPD),
(ii) a ratio of a multiplication product of the per-pixel area and a relative illumination (A× RI) to the PPD,
wherein the method comprises controlling the exposure of photo-sensitive cells of different regions in the photo-sensitive surface, based on different values of the illumination parameter in the different regions.

A technical effect of controlling the exposure of the photo-sensitive cells in such a manner is that it enables the imaging system to adapt to varying lighting conditions across the visual scene, even when there is high contrast.

DETAILED DESCRIPTION OF THE DRAWINGS

Referring to FIG. 1, illustrated is a block diagram of an architecture of an imaging system 100 incorporating exposure control using light valve device 102, in accordance with an embodiment of the present disclosure. The imaging system 100 comprises an image sensor 104, the light valve device 102, and at least one processor (depicted as a processor 106).

The processor 106 is communicably coupled with the image sensor 104 and the light valve device 102. The processor 106 is configured to perform various operations, as described earlier with respect to the aforementioned first aspect.

It may be understood by a person skilled in the art that the FIG. 1 includes a simplified architecture of the imaging system 100 for sake of clarity, which should not unduly limit the scope of the claims herein. It is to be understood that the specific implementation of the imaging system 100 is provided as an example and is not to be construed as limiting it to specific numbers or types of image sensors and processors. The person skilled in the art will recognize many variations, alternatives, and modifications of embodiments of the present disclosure. Optionally, the imaging system 100, further comprises a colour filter array and a lens system. The processor 106 is optionally communicably coupled with the colour filter array and the lens system.

Figure 2:
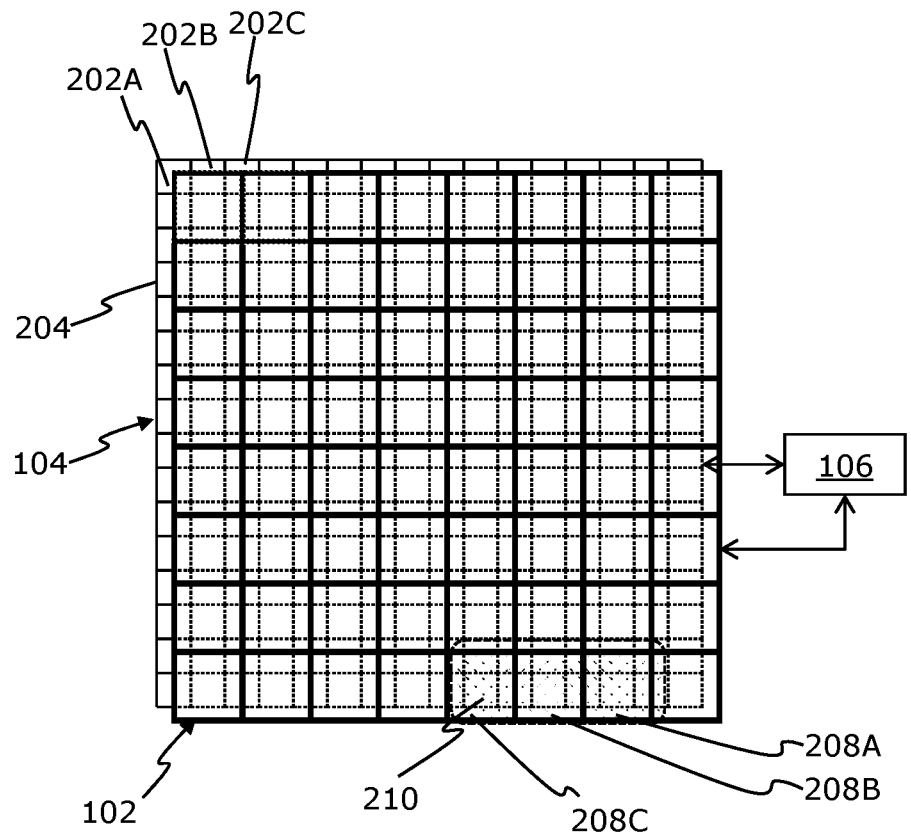
FIG. 2 is an exemplary way of performing exposure control using the light valve device of FIG. 1, in accordance with an embodiment of the present disclosure.

Referring to FIG. 2, there is shown an exemplary way of performing exposure control using the light valve device 102 (as shown in bold grid) of FIG. 1, in accordance with an embodiment of the present disclosure. The image sensor 104 comprises a plurality of photo-sensitive cells (depicted as exemplary photo-sensitive cells 202A, 202B, and 202C) arranged on a photo-sensitive surface 204. The photo-sensitive cells 202A-C are arranged in a rectangular 2D grid (depicted as a 16×16 grid) on the photo-sensitive surface 204. The light valve device 102 comprises an array of light valves 208A, 208B and 208C, wherein the array of light valves 208A-C is arranged on an optical path of the photo-sensitive surface 204. The light valves 208A-C are arranged in a rectangular 2D grid (depicted as an 8×8 grid). In this regard, the processor 106 is configured to control an exposure of the photo-sensitive cells 202A-C of at least a first region 210 (as shown by dotted pattern within dashed box) in the photo-sensitive surface by utilising respective light valves 208A-C of said array.

FIG. 2 is merely an example, which should not unduly limit the scope of the claims herein. A person skilled in the art will recognize many variations, alternatives, and modifications of embodiments of the present disclosure.

Figure 3:
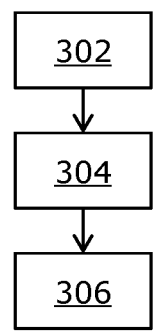
FIG. 3 illustrates steps of a method incorporating exposure control using light valve device, in accordance with an embodiment of the present disclosure.

Referring to FIG. 3, illustrated are steps of a method incorporating exposure control using light valve device, in accordance with an embodiment of the present disclosure. The method is implemented by an imaging system comprising an image sensor, a light valve device and at least one processor. At step 302, an exposure of photo-sensitive cells of at least a first region in the photo-sensitive surface is controlled by utilising respective LC cells of said array. At step 304, image data is read out from the photo-sensitive cells of the image sensor. At step 306, the image data is processed to generate an image.

The aforementioned steps are only illustrative and other alternatives can also be provided where one or more steps are added, one or more steps are removed, or one or more steps are provided in a different sequence without departing from the scope of the claims herein.

The invention claimed is:
1. An imaging system comprising:
an image sensor comprising a plurality of photo-sensitive cells arranged on a photo-sensitive surface of the image sensor;
a light valve device comprising an array of light valves, wherein the array of light valves is arranged on an optical path of the photo-sensitive surface of the image sensor; and
at least one processor configured to:
control an exposure of photo-sensitive cells of at least a first region in the photo-sensitive surface by utilising respective light valves of said array;
read out image data from the photo-sensitive cells of the image sensor;
process the image data to generate an image;
detect when at least one image segment of a previous image represents at least one object that is in motion;
when it is detected that at least one image segment of a previous image represents at least one object that is in motion, identify a region in the photo-sensitive surface corresponding to the at least one image segment of the previous image; and
control an exposure of photo-sensitive cells of the identified region in the photo-sensitive surface by utilising a global-shutter setting for respective light valves of said array, wherein when utilising the global-shutter setting for the respective light valves, the at least one processor is configured to:
control the respective light valves to stop allowing light to pass therethrough;
drain the photo-sensitive cells of the identified region;
control the respective light valves to simultaneously or near-simultaneously start allowing the light to pass therethrough towards the photo-sensitive cells of the identified region; and
control the respective light valves to simultaneously or near-simultaneously stop allowing the light to pass therethrough, prior to reading out the image data from the photo-sensitive cells of the identified region.

2. The imaging system of claim 1, wherein an exposure of a given photo-sensitive cell is controlled by at least one of:
controlling a starting time instant at which a corresponding light valve starts to allow light to pass therethrough towards the given photo-sensitive cell,
controlling a stopping time instant at which the corresponding light valve stops to allow the light to pass therethrough towards the given photo-sensitive cell,
controlling a transparency of the corresponding light valve to partially allow the light to pass therethrough towards the given photo-sensitive cell.

3. The imaging system of claim 2, wherein the exposure of the given photo-sensitive cell is further controlled by at least one of:
increasing the transparency of the corresponding light valve over a first predefined time period after the starting time instant,
decreasing the transparency of the corresponding light valve over a second predefined time period before the stopping time instant.

4. The imaging system of claim 1, wherein the at least one processor is configured to control an exposure of photo-sensitive cells of a second region in the photo-sensitive surface also, by utilising respective light valves of said array, wherein the exposure of the photo-sensitive cells of the second region is different from the exposure of the photo-sensitive cells of the first region,
wherein the image data is processed by utilising a high-dynamic range (HDR) imaging technique.

5. The imaging system of claim 1, wherein the at least one processor is configured to:
detect when pixels in at least one image segment of a previous image have luminosity values that are higher than a predefined threshold luminosity value; and
when it is detected that pixels in at least one image segment of a previous image have luminosity values that are higher than the predefined threshold luminosity value, identify a region in the photo-sensitive surface that corresponds to the at least one image segment of the previous image as the first region,
wherein, when controlling, the exposure of the photo-sensitive cells of the first region in the photo-sensitive surface is reduced by utilising the respective light valves.

6. An imaging system comprising:
an image sensor comprising a plurality of photo-sensitive cells arranged on a photo-sensitive surface of the image sensor;
a light valve device comprising an array of light valves, wherein the array of light valves is arranged on an optical path of the photo-sensitive surface of the image sensor; and
at least one processor configured to:
control an exposure of photo-sensitive cells of at least a first region in the photo-sensitive surface by utilising respective light valves of said array;
read out image data from the photo-sensitive cells of the image sensor;
process the image data to generate an image;
wherein the exposure of the photo-sensitive cells of an entirety of the photo-sensitive surface is controlled by utilising a global-shutter setting for the light valves of the array, wherein when utilising the global-shutter setting for the light valves of the array, the at least one processor is configured to:
control the light valves to stop allowing light to pass therethrough;
drain the photo-sensitive cells;
control the light valves to simultaneously or near-simultaneously start allowing the light to pass therethrough towards respective photo-sensitive cells; and
control the light valves to simultaneously or near-simultaneously stop allowing the light to pass therethrough, prior to reading out the image data from the photo-sensitive cells.

7. An imaging system comprising:
an image sensor comprising a plurality of photo-sensitive cells arranged on a photo-sensitive surface of the image sensor;
a light valve device comprising an array of light valves, wherein the array of light valves is arranged on an optical path of the photo-sensitive surface of the image sensor; and
at least one processor configured to:
control an exposure of photo-sensitive cells of at least a first region in the photo-sensitive surface by utilising respective light valves of said array;
read out image data from the photo-sensitive cells of the image sensor;
process the image data to generate an image;
wherein an illumination parameter varies spatially across a field of view (FOV) of the image sensor), the illumination parameter being any one of:
(i) a ratio of a per-pixel area (A) to pixels per degree (PPD),
(ii) a ratio of a multiplication product of the per-pixel area and a relative illumination (A×RI) to the PPD,
wherein the at least one processor is configured to control the exposure of photo-sensitive cells of different regions in the photo-sensitive surface, based on different values of the illumination parameter in the different regions.

8. A method implemented by an imaging system comprising an image sensor, a light valve device and at least one processor, the method incorporating exposure control using the light valve device, wherein the method comprises:
controlling an exposure of photo-sensitive cells of at least a first region in a photo-sensitive surface by utilising respective light valves of an array, wherein the photo-sensitive cells are arranged on the photo-sensitive surface of the image sensor, and the array of light valves of the light valve device is arranged on an optical path of the photo-sensitive surface of the image sensor;
reading out image data from the photo-sensitive cells of the image sensor;

processing the image data to generate an image;
detecting when at least one image segment of a previous image represents at least one object that is in motion;
when it is detected that at least one image segment of a previous image represents at least one object that is in motion, identify a region in the photo-sensitive surface corresponding to the at least one image segment of the previous image; and
control an exposure of photo-sensitive cells of the identified region in the photo-sensitive surface by utilising a global-shutter setting for respective light valves of said array, wherein when utilising the global-shutter setting for the respective light valves, the method comprises:
control the respective light valves to stop allowing light to pass therethrough;
drain the photo-sensitive cells of the identified region;
control the respective light valves to simultaneously or near-simultaneously start allowing the light to pass therethrough towards the photo-sensitive cells of the identified region; and
control the respective light valves to simultaneously or near-simultaneously stop allowing the light to pass therethrough, prior to reading out the image data from the photo-sensitive cells of the identified region.

9. The method of claim 8, wherein an exposure of a given photo-sensitive cell is controlled by at least one of:
controlling a starting time instant at which a corresponding light valve starts to allow light to pass therethrough towards the given photo-sensitive cell,
controlling a stopping time instant at which the corresponding light valve stops to allow the light to pass therethrough towards the given photo-sensitive cell,
controlling a transparency of the corresponding light valve to partially allow the light to pass therethrough towards the given photo-sensitive cell.

10. The method of claim 8, wherein the method comprises controlling an exposure of photo-sensitive cells of a second region in the photo-sensitive surface also, by utilising respective light valves of said array, wherein the exposure of the photo-sensitive cells of the second region is different from the exposure of the photo-sensitive cells of the first region, wherein the image data is processed by utilising a high-dynamic range (HDR) imaging technique.

11. The method of claim 8, wherein the method comprises:
detecting when pixels in at least one image segment of a previous image have luminosity values that are higher than a predefined threshold luminosity value; and
when it is detected that pixels in at least one image segment of a previous image have luminosity values that are higher than the predefined threshold luminosity value, identifying a region in the photo-sensitive surface that corresponds to the at least one image segment of the previous image as the first region,
wherein, at the step of controlling, the exposure of the photo-sensitive cells of the first region in the photo-sensitive surface is reduced by utilising the respective light valves.

12. A method implemented by an imaging system comprising an image sensor, a light valve device and at least one processor, the method incorporating exposure control using the light valve device, wherein the method comprises:
controlling an exposure of photo-sensitive cells of at least a first region in a photo-sensitive surface by utilising respective light valves of an array, wherein the photo-sensitive cells are arranged on the photo-sensitive surface of the image sensor, and the array of light valves of the light valve device is arranged on an optical path of the photo-sensitive surface of the image sensor;
reading out image data from the photo-sensitive cells of the image sensor;
processing the image data to generate an image;
wherein the exposure of the photo-sensitive cells of an entirety of the photo-sensitive surface is controlled by utilising a global-shutter setting for the light valves of the array, wherein when utilising the global-shutter setting for the light valves of the array, the method comprises:
controlling the light valves to stop allowing light to pass therethrough;
draining the photo-sensitive cells;
controlling the light valves to simultaneously or near-simultaneously start allowing the light to pass therethrough towards respective photo-sensitive cells; and
controlling the light valves to simultaneously or near-simultaneously stop allowing the light to pass therethrough, prior to reading out the image data from the photo-sensitive cells.

13. A method implemented by an imaging system comprising an image sensor, a light valve device and at least one processor, the method incorporating exposure control using the light valve device, wherein the method comprises:
controlling an exposure of photo-sensitive cells of at least a first region in a photo-sensitive surface by utilising respective light valves of an array, wherein the photo-sensitive cells are arranged on the photo-sensitive surface of the image sensor, and the array of light valves of the light valve device is arranged on an optical path of the photo-sensitive surface of the image sensor;
reading out image data from the photo-sensitive cells of the image sensor;
processing the image data to generate an image;
wherein an illumination parameter varies spatially across a field of view (FOV) of the image sensor, the illumination parameter being any one of:
(i) a ratio of a per-pixel area (A) to pixels per degree (PPD),
(ii) a ratio of a multiplication product of the per-pixel area and a relative illumination (A x RI) to the PPD,
wherein the method comprises controlling the exposure of photo-sensitive cells of different regions in the photo-sensitive surface, based on different values of the illumination parameter in the different regions.

* * * * *